Oct. 1, 1963
F. H. LE JEUNE
3,105,292
METHOD OF MAKING BRAKE DRUMS
Filed Feb. 24, 1959
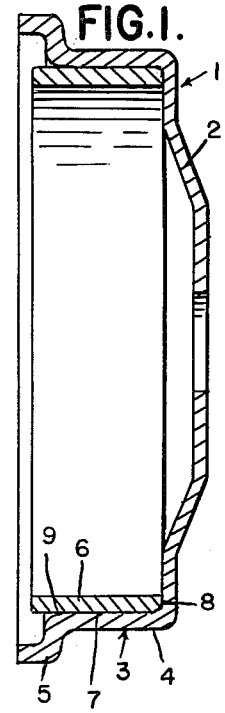
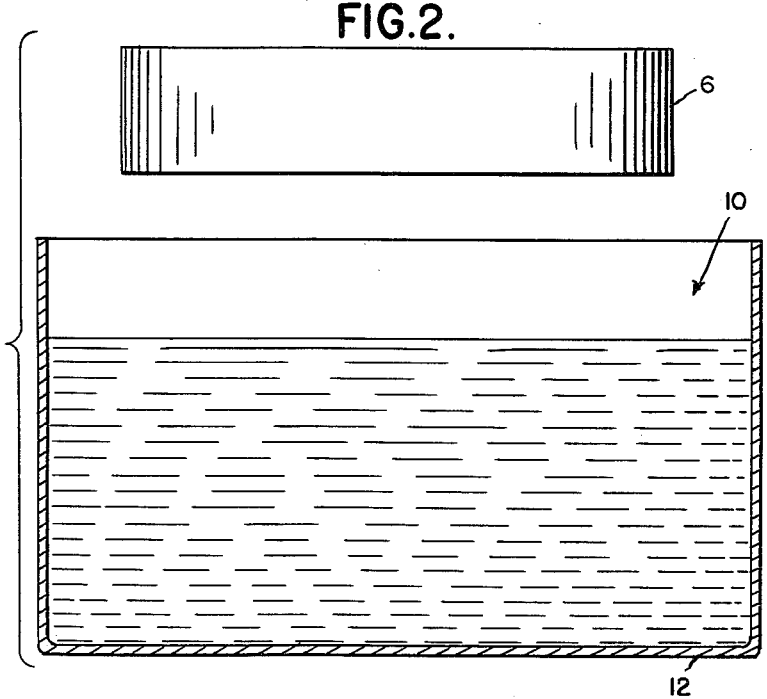
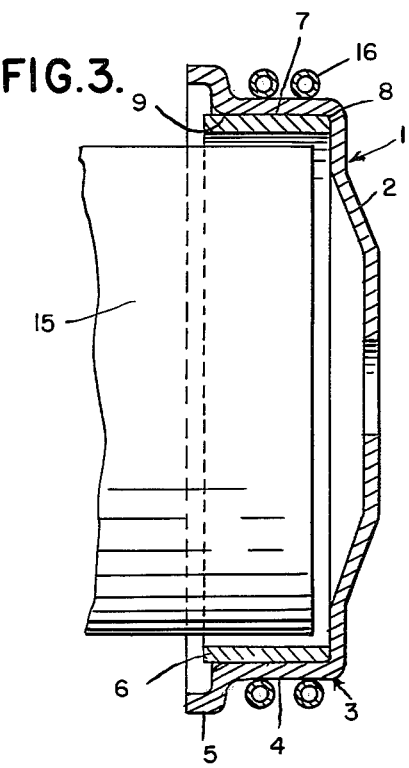
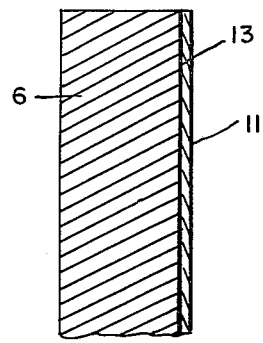
INVENTOR.
FRANK H. Le JEUNE
BY
Whittemore, Hulbert & Belknap
ATTORNEYS

United States Patent Office 3,105,292
Patented Oct. 1, 1963

3,105,292
METHOD OF MAKING BRAKE DRUMS
Frank H. Le Jeune, Jackson, Mich., assignor to Kelsey-Hayes Company, Detroit, Mich., a corporation of Delaware
Filed Feb. 24, 1959, Ser. No. 794,972
3 Claims. (Cl. 29—447)

This invention relates to a method of making brake drums and refers more particularly to a method of making brake drums of the type having an annular flange of aluminum or aluminum base alloy and a ferrous metal liner within and fixed to the flange.

The invention has for one of its objects to provide a method of making brake drums of the type composed of a shell having an annular flange of aluminum or aluminum base alloy and a cast-iron liner within the flange, in which the liner is secured to the flange with a molecular bond promoting heat transfer and providing a firm connection.

The invention has for another of its objects to provide a method as described above in which the liner and shell flange have an interference fit.

Other objects and features of the invention will become apparent as the description proceeds, especially when taken in conjunction with the accompanying drawing, wherein:

FIG. 1 is a radial sectional view of a brake drum made according to the method of this invention;

FIGS. 2 and 3 illustrate steps in the method; and

FIG. 4 is a sectional view of the liner coated with aluminum or an aluminum base alloy prior to assembly with the brake drum shell, in which the coating is exaggerated for clarity.

FIG. 1 illustrates a brake drum made by the method of this invention. The drum comprises a shell 1 which may be formed by stamping or casting for example of an aluminum containing metal of the class consisting of aluminum and aluminum base alloys. The shell has a web 2 and an annular flange 3 extending along the radially outer margin of the web. The flange has an axially extending annular portion 4 and a flared annular portion 5. The brake drum also includes a cast-iron annular liner 6 within and secured to the flange in a manner producing a strong molecular bond. The outside radius of the liner at room temperature, before assembly with the drum shell, is slightly greater than the inside radius of the flange portion 4 so as to have an interference fit therewith.

Before the liner is inserted into the shell flange, its radially outer surface in an annular zone 7 extending from the edge 8 to point 9 is thoroughly cleaned as by brushing or sand blasting to remove all foreign matter such as scale, dirt, grease and other material which would interfere with the formation of a strong bond. A chemically clean surface is preferred. The radially inner surface of the flange portion 4, which is adapted to engage annular zone 7 of the liner in the assembled condition of the brake drum, is cleaned in the same manner.

The liner is then dipped in a molten bath 10 of an aluminum containing metal, which is preferably aluminum but which may be an aluminum base alloy, to provide a coating 11 of the metal on the zone 7 of the radially outer surface of the liner. Since it is desired to coat only the zone 7 of the radially outer surface of the liner, the remaining surfaces thereof should be such that they will not be coated. Preferably the liner is initially heated to form an oxide thereon which resists coating by the molten metal of the bath, and this oxide is removed in the zone 7 only by the cleaning procedure outlined above.

The bath 11 of molten metal is contained in a crucible 12 or the like and maintained at a temperature between 1300° F. and 1400° F. The temperature of the bath depends upon the melting point of the aluminum containing metal of which it is composed, but in any case the temperature is maintained somewhat above its melting point.

The liner is lowered into the bath to coat the zone 7 only of the radially outer surface with the aluminum containing metal of the bath. A thin film of ferro-aluminum alloy will quickly form at the interface 13 between the liner 6 and coating 11 during the time that the liner is immersed. The period of immersion may vary, but a sufficient bond between the coating of the aluminum containing metal of the bath and the liner will normally be obtained within a few minutes, the formation of the alloy bond being promoted by the temperature of the bath employed. Preferably the time of immersion is of short duration in order to preclude the formation of a deep ferro-aluminum alloy on the outer surface of the liner since the ferro-aluminum alloy is a hard brittle metal not capable of withstanding much shock or distortion. For this reason the film of ferro-aluminum alloy should not be so thick as to weaken the bond.

Thereafter the liner is removed from the bath and cooled to solidify the coating 11 and arrest the formation of the alloy at the interface with the liner.

The shell flange is expanded by heating and the coated liner contracted by cooling so that the coated liner has substantially a line-to-line contact with the flange and may be pressed into assembled relation with the flange, as shown in FIG. 1, without difficulty. Prior to assembling the coated liner and drum shell, the coating 11 on the liner and the radially inner surface of the shell flange portion 4 may be coated with a suitable flux or protective coating. The flux or protective coating serves to exclude air from the surfaces coated to prevent the formation of oxides and thereby assist in fusing or molecularly bonding the liner to the shell flange as described below. With the shell flange and liner in pressure contact, the liner and radially inner surface of the shell flange are heated to the melting point of the coating and shell to fuse the coating to the flange. Preferably an induction heater 15 is inserted in the assembled liner and flange to heat the coating and the radially inner surface of the shell flange to their melting point, causing them to fuse together and form a molecular bond. Close control must be maintained to avoid over-heating and melting of the shell. In this connection, the cast-iron liner is more readily heated by induction than the aluminum shell due to its greater electrical resistance.

To avoid melting the shell, the induced current is controlled so that it flows through and heats the cast-iron liner, the coating 11 and the radially inner surface only of the shell flange, and a coil 16 carrying a circulating coolant is wrapped around the outer surface of the flange. The heating of the parts by induction is limited to a brief time interval sufficient to produce a fusion of the coating and flange metals at the interface. Only the inner surface of the flange is heated to the melting point and the rest of the shell is kept below the melting point by the coil 16.

After the assembled brake drum returns to room temperature, the liner is securely fixed to the shell with a molecular bond produced by the thin ferro-aluminum alloy at the interface between the liner and the coating, now fused to the shell flange.

What I claim as my invention is:

1. A method of making a brake drum formed of a shell having an annular flange of an aluminum containing metal and a ferrous metal liner received within said flange, comprising the steps of providing a thin coating of an aluminum containing metal on the outer surface of said liner having a ferro-aluminum bond at the interface between said coating and liner, inserting the coated liner concentrically within said flange with the coating in radial pressure contact with said flange, and applying heat to fuse the radially inner surface of said flange and coating together at the interface thereof, while simultaneously cooling the radially outer surface of said flange to keep the portions of the flange radially outwardly of the inner surface thereof below the melting point, thereby to avoid overheating and distortion of said flange.

2. A method of making a brake drum formed of a shell having an annular flange of an aluminum containing metal and a cast-iron liner received within and having an interference fit with said flange, comprising the steps of providing a thin coating of aluminum containing metal on the outer surface of said liner having a ferro-aluminum bond at the interface between said coating and liner, heating said flange to expand the same to an inside diameter substantially equal to the outside diameter of the coated liner, inserting the coated liner concentrically within the heated flange with the coating in radial pressure contact with said flange to provide the aforesaid interference fit when said flange is cooled, and applying heat from a heating source placed within said liner in a radially outward direction through the wall of said liner to fuse the radially inner surface of said flange and coating together at the interface thereof while simultaneously cooling the radially outer surface of said flange to keep the portions of the flange radially outwardly of the inner surface below the melting point, thereby to avoid overheating and distortion of said flange.

3. A method of making a brake drum formed of a shell having an annular flange of an aluminum containing metal and a cast-iron liner received within and having an interference fit with said flange, comprising the steps of applying to the outer surface of said liner a thin coating of an aluminum containing metal by immersing said liner in a molten bath of the same for a time sufficient to form a film of ferro-aluminum alloy at the interface between said coating and liner, removing the liner from said bath and cooling the coating thereon to solidify the same and arrest formation of the ferro-aluminum alloy, heating the flange to expand the same to an inside diameter substantially equal to the outside diameter of the coated liner, inserting the coated liner concentrically within the heated flange with the coating in radial pressure contact with said flange to provide the aforesaid interference fit when said flange is cooled, and applying heat from a heating source placed within said liner in a radially outward direction through the wall of said liner to fuse the radially inner surface of said flange and coating together at the interface thereof while simultaneously cooling the radially outer surface of said flange by a cooling member surrounding said flange to keep the portions of the flange radially outwardly of the inner surface thereof below the melting point, thereby to avoid overheating and distortion of said flange.

References Cited in the file of this patent

UNITED STATES PATENTS

| | | |
|---|---|---|
| 579,969 | Fellows | Apr. 6, 1897 |
| 1,403,257 | Lewis | Jan. 10, 1922 |
| 1,615,591 | Mallory | Jan. 25, 1927 |
| 1,918,197 | Sebell | July 11, 1933 |
| 1,974,949 | Campbell | Sept. 25, 1934 |
| 2,224,145 | Dugan et al. | Dec. 10, 1940 |
| 2,264,004 | Patterson et al. | Nov. 25, 1941 |
| 2,267,339 | Paulsen | Dec. 23, 1941 |
| 2,396,730 | Whitfield et al. | Mar. 19, 1946 |
| 2,401,231 | Crawford | May 28, 1946 |
| 2,412,271 | Kercher | Dec. 10, 1946 |
| 2,756,488 | Stevens | July 31, 1956 |
| 2,768,433 | O'Donnell | Oct. 30, 1956 |
| 2,977,675 | Simms | Apr. 4, 1961 |

FOREIGN PATENTS

| | | |
|---|---|---|
| 553,341 | Canada | Feb. 18, 1958 |